(No Model.)
T. A. EDISON.
ELECTRICAL TRANSMISSION OF POWER.
No. 370,125. Patented Sept. 20, 1887.
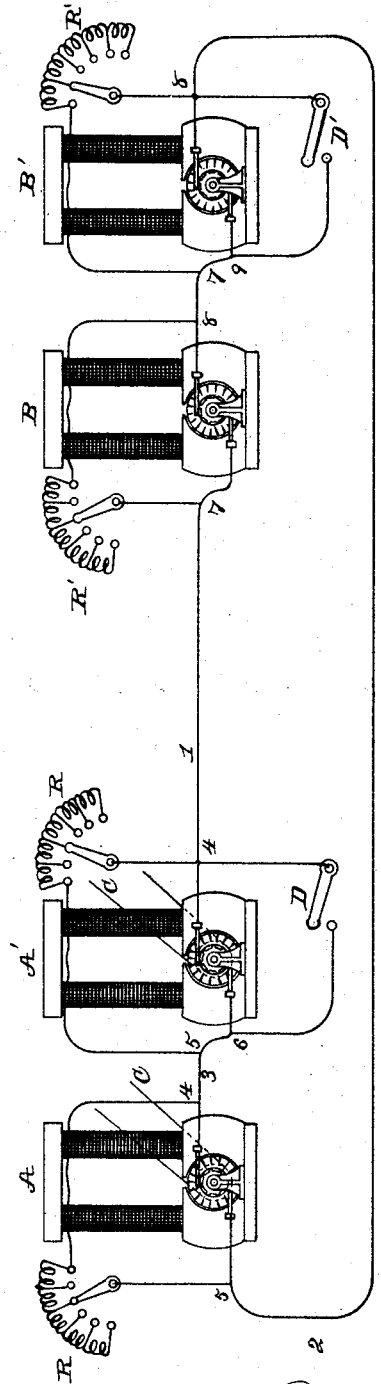
ATTEST:
E. C. Rowland
INVENTOR:
Thomas A. Edison
By Rich.d N. Dyer
Atty.

UNITED STATES PATENT OFFICE.

THOMAS A. EDISON, OF MENLO PARK, NEW JERSEY.

ELECTRICAL TRANSMISSION OF POWER.

SPECIFICATION forming part of Letters Patent No. 370,125, dated September 20, 1887.

Application filed June 7, 1883. Serial No. 97,325. (No model.)

*To all whom it may concern:*

Be it known that I, THOMAS A. EDISON, of Menlo Park, in the county of Middlesex and State of New Jersey, have invented a new and useful Improvement in Electrical Transmission of Power, (Case No. 567,) of which the following is a specification.

My invention relates to systems in which dynamo-electric generators and electro-dynamic motors are run in series, my object being to so arrange such machines that the generators and motors can be regulated independently each machine of each other machine, and so that any one machine may be cut out of circuit without affecting the others. In accomplishing this I place the two or more generators in series as to their armatures, but with their field-magnets each in a separate shunt-circuit provided with an adjustable resistance; and I also provide shunts around individual generators, provided with switches or circuit-controllers for cutting them out of circuit. The two or more motors I arrange and connect in the same way. The generators arranged in this way are independently controllable, as likewise are the motors.

If one or more of the motors be cut out of circuit, so that the remainder can be supplied by a less number of generators than those previously in use, one or more generators can be cut out, so that only enough current will be generated for the motors in use; or if the decrease in the number of motors is not sufficient to make it desirable to decrease the number of generators, the resistances in the field-circuits of the generators already in circuit would be increased to diminish the current generated. This arrangement is shown diagrammatically in the accompanying drawing.

A A' represent dynamo-electric machines, and B B' electro-dynamic motors. The generators A A' are placed in series connected by a wire, 3, and 1 2 are the conductors of the main circuit extending from them. Their armatures are revolved by belts C, connecting them with a suitable source of power. The field-magnet of each machine is in a shunt-circuit, 4 5, and each field-circuit contains an adjustable resistance, R. Around the generator A' a shunt, 4 6, is formed, provided with a circuit-controller, D, by closing which the generator is removed from circuit. The electro-dynamic motors B B' are arranged in a similar manner, their fields being in shunts 7 8, and such shunts being each provided with an adjustable resistance, R'. The shunt 8 9 around the motor B' contains a circuit-controller, D', for cutting the motor out of circuit.

It is evident that as many generators as desired can be employed in connection with any desired number of motors. Any or all of them can be provided with shunts for throwing them out of circuit. It is also evident that this arrangement of generators can be employed in connection with a single motor or with any number of motors arranged in any convenient manner other than that described; or, vice versa, a single generator or a number arranged in any convenient way can be used in connection with a series of motors arranged and connected as described.

What I claim is—

1. The combination, with two or more dynamo or magneto electric machines connected in series and independently controllable, of two or more electro-dynamic motors also connected in series and independently controllable, substantially as set forth.

2. The combination of dynamo or magneto electric machines and electro-dynamic motors arranged in series, and means for regulating the current in the field-circuit of each generator and each motor independent of all the other generators and motors, substantially as set forth.

3. The combination, with dynamo or magneto electric machines and electro-dynamic motors arranged in series in a main circuit, of shunt-circuits, one including the field-coils of each generator or motor, and means for regulating the current in each shunt-circuit, substantially as set forth.

4. The combination, with dynamo or magneto electric machines and electro-dynamic motors arranged in series in a main circuit, of shunts around individual generators or motors, and a circuit-controller in each shunt, substantially as set forth.

5. The combination, with two or more dynamo or magneto electric machines arranged in series and connected with two or more independent electro-dynamic motors also arranged in series, of means for independently regulating each of said generators, and means for removing individual generators from circuit without affecting the other generators, substantially as set forth.

This specification signed and witnessed this 1st day of June, 1883.

THOS. A. EDISON.

Witnesses:
  H. W. SEELY,
  EDWARD H. PYATT.